(12) United States Patent
Umemoto et al.

(10) Patent No.: US 8,529,722 B2
(45) Date of Patent: Sep. 10, 2013

(54) METHOD FOR MANUFACTURING LIQUID CRYSTAL DISPLAY DEVICE

(75) Inventors: Seiji Umemoto, Ibaraki (JP); Seiji Kondo, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 76 days.

(21) Appl. No.: 13/079,393

(22) Filed: Apr. 4, 2011

(65) Prior Publication Data
US 2012/0118488 A1 May 17, 2012

(30) Foreign Application Priority Data
Nov. 12, 2010 (JP) .................................. 2010-253850

(51) Int. Cl.
*B29C 65/00* (2006.01)
*B32B 37/00* (2006.01)
*B32B 38/04* (2006.01)

(52) U.S. Cl.
USPC ........... 156/257; 156/164; 156/249; 156/264; 156/268; 156/270

(58) Field of Classification Search
USPC ................. 156/163, 164, 229, 248, 249, 257, 156/268, 263, 270
See application file for complete search history.

(56) References Cited

U.S. PATENT DOCUMENTS

| | | | | |
|---|---|---|---|---|
| 7,980,285 B2 * | 7/2011 | Kitada et al. | .................. | 156/511 |
| 8,002,010 B2 * | 8/2011 | Kitada et al. | .................. | 156/511 |
| 8,083,885 B2 * | 12/2011 | Kitada et al. | .................. | 156/259 |
| 8,114,237 B2 * | 2/2012 | Kitada et al. | .................. | 156/259 |
| 8,317,961 B2 * | 11/2012 | Kitada et al. | .................. | 156/257 |
| 2005/0016670 A1 | 1/2005 | Kanbara et al. | | |
| 2006/0124248 A1 | 6/2006 | Kanbara et al. | | |
| 2009/0199950 A1 | 8/2009 | Kitada et al. | | |
| 2009/0218049 A1 | 9/2009 | Kanbara et al. | | |
| 2009/0263608 A1 | 10/2009 | Kitada et al. | | |
| 2010/0186890 A1 | 7/2010 | Kitada et al. | | |
| 2010/0206977 A1 | 8/2010 | Kitada et al. | | |
| 2010/0212822 A1 | 8/2010 | Kitada et al. | | |

(Continued)

FOREIGN PATENT DOCUMENTS

| | | |
|---|---|---|
| JP | 2004-333647 A | 11/2004 |
| JP | 2004-361741 A | 12/2004 |

(Continued)

OTHER PUBLICATIONS

Japanese Office Action dated Jan. 25, 2013, issued in corresponding Japanese Patent Application No. 2010-253850.

*Primary Examiner* — Linda L Gray
(74) *Attorney, Agent, or Firm* — Westerman, Hattori, Daniels & Adrian, LLP (57) ABSTRACT

A method of manufacturing a liquid crystal display device that prevents a liquid crystal panel from warping into a shape concave to the viewer side. The method including a bonding step including providing sheet-shaped optical members each including a polarizing plate and an adhesive layer or a pressure-sensitive adhesive layer and bonding the sheet-shaped optical members to both surfaces of a rectangular liquid crystal cell with the adhesive layer or a pressure-sensitive adhesive layer. The bonding step includes continuously pressing the optical member from its end to bond the optical member from its end to bond the optical member to the liquid crystal cell, while applying a tension to the optical member and stacking the liquid crystal cell and the optical member.

8 Claims, 5 Drawing Sheets

(56) References Cited

U.S. PATENT DOCUMENTS

| | | |
|---|---|---|
| 2010/0258250 A1 | 10/2010 | Kitada et al. |
| 2010/0282406 A1 | 11/2010 | Kitada et al. |
| 2010/0288441 A1 | 11/2010 | Kitada et al. |
| 2010/0300606 A1 | 12/2010 | Kitada et al. |

FOREIGN PATENT DOCUMENTS

| | | |
|---|---|---|
| JP | 2005-037416 A | 2/2005 |
| JP | 2005-037417 A | 2/2005 |
| JP | 2006-267503 A | 10/2006 |
| JP | 2009-061498 A | 3/2009 |
| JP | 2009-109602 A | 5/2009 |
| JP | 2009-109624 A | 5/2009 |
| JP | 2009-133931 A | 6/2009 |
| JP | 4307510 B1 | 8/2009 |
| JP | 4406043 B2 | 1/2010 |

* cited by examiner

METHOD FOR MANUFACTURING LIQUID CRYSTAL DISPLAY DEVICE

TECHNICAL FIELD

The present invention relates to methods for manufacturing a liquid crystal display device and particularly to a liquid crystal display device manufacturing method including the step of bonding sheet-shaped optical members each including a polarizing plate to both surfaces of a liquid crystal cell.

BACKGROUND ART

One of the liquid crystal display (LCD) manufacturing steps includes a bonding step in which sheet-shaped optical members each including a polarizing plate are bonded to both surfaces of a liquid crystal cell including a pair of substrates and a liquid crystal layer interposed therebetween. In general, such optical members include a polarizing plate and an adhesive or pressure-sensitive adhesive layer formed on one side of the polarizing plate.

A method used for bonding such optical members to a liquid crystal cell includes feeding the optical members and the liquid crystal cell in the same direction and press-boding the optical members to the liquid crystal cell, while stacking them. Specifically, a known method includes: feeding the liquid crystal cell and the optical members between a pair of rollers opposed to each other and placed perpendicular to the direction of feeding of the liquid crystal cell and the optical members (a guide roller for feeding the liquid crystal cell and a bonding roller for press-bonding the optical members to the liquid crystal cell), while stacking them; and press-bonding the optical members to the liquid crystal cell. In this case, the adhesive or pressure-sensitive adhesive layer formed on the optical member may be covered with a peelable release film, and the optical member may be bonded to the liquid crystal cell by the above step, while or after the release film is peeled off.

Examples of such a liquid crystal display device manufacturing method include a piece-by-piece manufacturing method in which optical members obtained by previously cutting into predetermined sizes are bonded to a liquid crystal cell by the above method; and a continuous manufacturing method in which optical members fed from continuous rolls are sequentially bonded to a liquid crystal cell, while cutting the optical members with the carrier films left uncut (see Patent Document 1).

In particular, the continuous manufacturing method is significantly advantageous in terms of mass productivity or yield as compared with the conventional piece-by-piece method, because the step of continuously bonding the optical members to the liquid crystal cell is achieved. In that method, the optical members are preferably bonded under a certain tension for such a purpose as to suppress wrinkles or air bubbles in the process of bonding the optical members to the liquid crystal cell. In the method for continuously manufacturing a liquid crystal display device, which includes feeding a carrier film on which the optical member is placed, a tension has to be applied in the feed direction, that is, in the longitudinal direction of the carrier film, and also the bonding has to be performed while the optical film is pulled. Therefore, a tension is also preferably applied between the bonding roller and the optical member.

In the bonding of the optical member, slack in the optical member may cause a failure of the bonding. Since it may cause wrinkles or air bubble, the optical member has to be kept smooth, and therefore, the application of a tension to the optical member is still important. If the tension is too high, however, a serious problem with quality or display quality, such as a cause of film rupture or a photo-elasticity-induced retardation may occur.

For example, an elongated polarizing plate may be bonded under a tension applied along its longitudinal direction, and the pair of rollers may be used to apply a tension to the optical member.

The optical member typically includes a polarizing plate. Such a polarizing plate is generally produced by allowing a dichroic material to adsorb to a polyvinyl alcohol (PVA) film and stretching the film. It usually has absorption dichroism for electromagnetic waves including visible rays and has an absorption axis parallel to the stretching axis.

Patent Document 2 discloses a continuous manufacturing method using a set of continuous rolls including long optical members which have been previously produced according to the size of a liquid crystal cell. Specifically, the method includes: using a set of continuous rolls including long optical members having undergone slitting in the direction of the absorption axis of the polarizing plate into sizes corresponding to the short and long sides of a rectangular liquid crystal cell; cutting the long optical members fed from the continuous rolls, respectively, into lengths corresponding to the long and shot sides of the liquid crystal cell; and bonding the cut pieces to the liquid crystal cell. Such a continuous manufacturing method allows efficient bonding to both surfaces of a rectangular liquid crystal cell simply by cutting the long optical members fed from the continuous rolls into predetermined lengths.

As liquid crystal panels are increasingly used in liquid crystal televisions, they are increasingly required to have larger sizes and higher quality. Such high-performance liquid crystal panels use a high display quality mode such as a normally-black vertically aligned (VA) mode or a horizontal electric field (IPS) mode. To form such liquid crystal panels, optical members including polarizing plates each having an absorption axis parallel to a side of a rectangular liquid crystal cell need to be bonded orthogonal to each other to the rectangular liquid crystal cell.

In a laterally-long rectangular liquid crystal display, for a polarizing sunglass measure or the like, polarizing plates bonded to a liquid crystal panel preferably have a viewer side (upper side) absorption axis placed in the lateral direction, that is, the longitudinal direction, and a backlight side (lower side) absorption axis placed in the vertical direction, that is, the transverse direction.

Patent Documents 4 to 7 also disclose part of the continuous manufacturing method.
Prior Art Document
Patent Documents
  Patent Document 1: Japanese Patent Application Laid-Open (JP-A) No. 2009-61498
  Patent Document 2: Japanese Patent No. 4406043
  Patent Document 3: Japanese Patent No. 4307510
  Patent Document 4: JP-A No. 2004-361741
  Patent Document 5: JP-A No. 2004-333647
  Patent Document 6: JP-A No. 2005-37416
  Patent Document 7: JP-A No. 2005-37417

SUMMARY OF THE INVENTION

Problems to be Solved by the Invention

Unfortunately, when a liquid crystal panel is manufactured by the methods described above, a tension cannot be applied to the liquid crystal cell, because the liquid crystal cell is generally composed mainly of glass materials. Therefore, a tension is applied only to the optical member. The resulting liquid crystal panel is in the form of a thin plate and therefore may be slightly warped by the influence of the tension on the bonded optical member. Such warping, which is caused by the tension on the optical member, is concave with the optical member-bonded side of the liquid crystal cell placed inside. Such warping may cause a reduction in the display performance of a liquid crystal display device when a liquid crystal panel for use in a high-image-quality liquid crystal display device is manufactured. In particular, warping into a shape concave to the viewer side of the liquid crystal panel may affect the display performance.

Specifically, when the warping is concave to the viewer side of the liquid crystal panel, the central part may come into contact with the backlight, so that the optical properties of a diffusion plate, a prism sheet or the like or the interface may change at the contact portion, which may cause indefinite unevenness at the center of the liquid crystal panel. The warping may also cause the corner of the liquid crystal panel to come into contact with the bezel (frame member) of the liquid crystal display device, so that photo-elasticity-induced optical distortion may occur to cause light leakage at the corner of the liquid crystal panel.

In recent years, as liquid crystal display devices have been required to be larger and thinner, liquid crystal panels also have been required to be larger and thinner. Therefore, the length of each side of liquid crystal cells tends to become larger and larger relative to their thickness, and, therefore, panel warping as mentioned above and a display performance problem caused by the warping have come into the front.

Concerning about these problems, Patent Documents 1 to 6 disclose nothing about the above issues themselves. Patent Documents 1 to 6 do not have any suggestions for the present invention.

It is therefore an object of the present invention to provide a liquid crystal display device manufacturing method that can prevent a liquid crystal panel from warping into a shape concave to the viewer side in the process of manufacturing the liquid crystal panel by bonding optical members to both surfaces of a liquid crystal cell so that a good display state can be achieved.

Means for Solving the Problems

As a result of investigations, the inventors have found that when the process of bonding optical members to both surfaces of a rectangular liquid crystal cell includes first performing the bonding to the backlight-side surface in the transverse direction and then performing the bonding to the viewer-side surface in the longitudinal direction, a stress can be previously applied so that the liquid crystal cell can become convex to the viewer side and therefore can be prevented from warping into a shape concave to the viewer side. At the same time, the inventors have found that the advantageous effect becomes higher when a tension applied in the bonding along the transverse direction is higher than that in the bonding along the longitudinal direction. The present invention has been completed based on the findings.

An embodiment of the invention is directed to a method for manufacturing a liquid crystal display device, which includes a bonding step comprising providing sheet-shaped optical members each comprising a polarizing plate and an adhesive layer or a pressure-sensitive adhesive layer and bonding the sheet-shaped optical members to both surfaces of a rectangular liquid crystal cell with the adhesive layer or the pressure-sensitive adhesive layer, wherein the bonding step comprises continuously pressing the optical member from its end to bond the optical member to the liquid crystal cell, while applying a tension to the optical member and stacking the liquid crystal cell and the optical member, the bonding step comprises: a first bonding step comprising placing the optical member in such a manner that an absorption axis of the polarizing plate is kept parallel to a transverse direction of the liquid crystal cell, wherein the optical member has a width corresponding to the length of a long side of the liquid crystal cell, and bonding the optical member to a backlight-side surface of the liquid crystal cell in a direction along the transverse direction; and a second bonding step comprising placing the optical member in such a manner that an absorption axis of the polarizing plate is kept parallel to a longitudinal direction of the liquid crystal cell, wherein the optical member has a width corresponding to the length of a short side of the liquid crystal cell, and bonding the optical member to a viewer-side surface of the liquid crystal cell in a direction along the longitudinal direction, the tension applied to the optical member in the first bonding step is substantially equal to or higher than the tension applied to the optical member in the second bonding step, and the first bonding step is performed before the second bonding step.

According to the present invention, the first bonding step including bonding the optical member to the backlight-side surface of the liquid crystal cell in a direction along the transverse direction is followed by the second bonding step including bonding the optical member to the viewer-side surface of the liquid crystal cell in a direction along the longitudinal direction. According to the present invention, therefore, a tensile stress can be applied to the polarizing plate bonded to the backlight-side surface of the liquid crystal cell, so that the stress can be applied in such a manner that the liquid crystal cell can be previously convex to the viewer side, which makes it possible to prevent the rectangular liquid crystal panel, which is formed by bonding the optical members to both surfaces of the liquid crystal cell, from warping into a shape convex to the backlight side.

Specifically, when a liquid crystal panel is obtained by bonding an optical member under a certain tension applied to the optical member along the transverse direction in the process of bonding the optical member including a polarizing plate, it is considered that a contraction stress is applied in the transverse direction based on the contraction stress on the polarizing plate from the backlight side or that warping slightly occurs with the polarizing plate-bonded surface placed inside. In the transverse direction bonding, the liquid crystal cell is basically in a free state, and no or little force is applied thereto.

According to the present invention, the bonding in the longitudinal direction is performed after the first bonding step in the transverse direction. Therefore, due to the effect of the tension applied to the polarizing plate used in the first bonding step, the contraction force of the polarizing plate is applied from the backlight side to the liquid crystal panel in the transverse direction, or warping slightly occurs with the polarizing plate-bonded surface placed inside, that is, in a shape convex to the viewer side. The polarizing plate is bonded to the liquid crystal cell in such a state.

As described above, even when the polarizing plate is bonded in a continuous manner, a certain tension needs to be applied during the bonding, regardless of whether the bonding is the first or second bonding step. In this case, when the first bonding step previously applies a contraction force to the liquid crystal panel from the backlight side or when the liquid crystal panel is slightly warped with the polarizing plate-bonded surface placed inside, an attempt to curl the liquid crystal panel with the longitudinally bonded polarizing plate placed inside, that is, to curl the liquid crystal panel into a shape convex to the viewer side in the second bonding step of bonding the polarizing plate to the opposite surface requires temporary correction of the warping, which needs the application of a tension higher than that in the free case.

Thus, when the first bonding step includes bonding the polarizing plate to the liquid crystal panel under a certain tension applied to the polarizing plate, the liquid crystal panel can be prevented from curling into a shape convex to the backlight side. However, when the tension T2 applied to the optical member in the second bonding step is considerably higher than the tension T1 applied to the optical member in the first bonding step, that is, when T1<<T2 (1), a certain trigger may cause the liquid crystal panel to curl into a shape convex to the backlight side beyond the state where the contraction force is applied or beyond the regulation force of the curling.

However, when the tension T1 in the first bonding step and the tension T2 in the second bonding step satisfy the relation T1≧T2 (2), curling into a shape convex to the backlight side can be almost prevented even under the application of a trigger such as an impact.

T1>T2 is more preferred, and T2 is preferably as low as possible, as long as there is no interference with the bonding.

According to an embodiment of the present invention, therefore, a liquid crystal panel can be obtained without curling into a shape convex to the backlight side.

Next, a discussion is provided on the case where the second bonding step is performed before the first bonding step in contrast to the present invention. In this case, the polarizing plate is first bonded to the viewer side of the liquid crystal cell under a tension applied to the polarizing plate along the longitudinal direction in the second bonding step performed first. Therefore, a contraction force is applied to the liquid crystal panel from the viewer-side polarizing plate, or the liquid crystal panel is slightly warped into a shape convex to the backlight side. Particularly in this case, the bending rigidity is low, and warping occurs more easily than in the case of the short side, because the bonding length in the longitudinal direction of the liquid crystal panel with respect to the width of the liquid crystal panel is longer than that in the transverse direction.

When the second bonding step is performed first as mentioned above, the first bonding step needs to bond the polarizing plate to the liquid crystal panel in such a state. Therefore, considering the effect of the tension to be applied to the polarizing plate in the first bonding step, the second bonding step needs to bond the polarizing plate in the longitudinal direction in such a manner that the liquid crystal panel can be slightly curled along the longitudinal direction with the polarizing plate-bonded surface placed inside.

To correct such warping so that the liquid crystal panel can be flat, therefore, the first bonding step needs to apply a higher tension to the polarizing plate being bonded along the transverse direction. In such a case, a slight change in tension may cause a significant change in warping direction or warping degree, so that it may be difficult to produce a liquid crystal panel being stably flat or slightly curling into a shape convex to the viewer side.

In addition, when the polarizing plate is first bonded along the transverse direction under a certain tension in the first bonding step, the tension on the polarizing plate being bonded later in the second bonding step can be made small, so that a liquid crystal panel being stably flat or slightly curing into a shape convex to the viewer side can be produced.

If the polarizing plate is bonded under a too high tension, the stress on the polarizing plate can impart significant photo-elasticity to the polarizing plate itself or the substrate of the liquid crystal cell, so that a certain retardation may be generated to cause light leakage from the liquid crystal panel and that such a defect as corner unevenness may occur to reduce the optical properties of the liquid crystal panel, which is not preferred. In addition, excessive curing can significantly affect the appearance of the flat panel display, which is also not preferred.

The present invention is significantly effective for a larger and thinner liquid crystal cell, because such a liquid crystal cell forms a liquid crystal panel with reduced bending rigidity. The invention is also significantly effective in forming a liquid crystal panel with a high aspect ratio, because such a liquid crystal panel has a large difference in bending rigidity between the directions.

The present invention as described above is also effective in a piece-by-piece manufacturing method including fully cutting an optical member including a release film to form a cut piece and then bonding the cut piece to a liquid crystal cell. However, the method of the invention is more suitable for a continuous manufacturing method including: providing a continuous roll that is previously produced with a size corresponding to the width of a liquid crystal cell and includes an optical member, a pressure-sensitive adhesive layer, and a release film provided on the pressure-sensitive adhesive layer; using the release film as a carrier film; and bonding the optical member to the liquid crystal cell while feeding the optical member from the continuous roll, because the tension on the optical member can be easily controlled using the carrier film. Specifically, the tension on the optical member can be easily controlled by adjusting the carrier film-feeding tension and the bonding roller pulling speed.

The piece-by-piece manufacturing method may include providing an optical member previously formed by punching according to the size of the liquid crystal cell; and bonding the optical member to a liquid crystal cell to form a liquid crystal cell. In this case, the release film is peeled off from the pressure-sensitive adhesive layer of the optical member, and the optical member is bonded to the liquid crystal cell from its one end, while being held by holding means. In this case, therefore, a tension is applied to the optical member between the optical member holding means and the bonding roll.

The liquid crystal cell for use in an embodiment of the present invention may be of any size. However, since substrates for large liquid crystal panels are almost constant in thickness, as the size of the liquid crystal cell increases, the bending rigidity of the liquid crystal cell decreases, and the liquid crystal panel having the bonded polarizing plate can be easily warped, so that the present invention becomes more effective. One of the challenges to small liquid crystal panels is a reduction in thickness, and a thin glass substrate is used to form a thin liquid crystal cell. Therefore, as the thickness of the liquid crystal cell decreases, the bending rigidity decreases, so that the present invention becomes more effective. The present invention is also more effective in forming a product with an aspect ratio of 16:9, such as a wide screen monitor, a notebook PC, or a liquid crystal television than in forming a product with an aspect ratio of 4:3, such as a usual monitor or notebook PC.

The liquid crystal cell having such a feature is large and thin and therefore vulnerable to warping. However, when the second bonding step is performed after the first bonding step and when the tension applied to the polarizing plate in the first bonding step is made higher than the tension applied in the second bonding step, a liquid crystal panel prevented from warping can be obtained using such a liquid crystal cell.

The optical member used in the first bonding step has been preferably previously cut into a length corresponding to the length of the short side of the liquid crystal cell, and the optical member used in the second bonding step has been preferably previously cut into a length corresponding to the length of the long side of the liquid crystal cell. In an embodiment of the present invention, after the first and second bonding steps are performed, the optical member may be cut into a piece with a size corresponding to the length of each side of the liquid crystal cell. However, the cutting performed previously as described above makes it possible to simplify the process and the apparatus.

It is preferable that the method further includes a step comprising: using a release film on which the adhesive or pressure-sensitive adhesive layer of each of the optical members is placed; and feeding the optical members to the first and second bonding steps while peeling off the release film from each of the optical members. When the release film is attached until immediately before the bonding as described above, high handleability can be achieved in the transporting and feeding, so that the tension can be more easily controlled when bonding the optical member.

It is preferable that the method further includes a step, before the bonding step, obtaining each of the sheet-shaped optical members by transversely cutting, at predetermined intervals, a long sheet comprising a laminate of the optical member, the adhesive or pressure-sensitive adhesive layer, and a release film placed on the adhesive or pressure-sensitive adhesive layer while leaving the release film uncut.

According to such a feature, the optical member is cut while the release film is left uncut, so that cut pieces of the optical member are formed on the release film. This is advantageous not only in that the tension on the optical member can be easily controlled as described above but also in that the optical members can be continuously supplied, so that the optical member and the liquid crystal cell can be more easily handled before bonded together than in the case where the optical member material including the release film is cut.

In such a continuous manufacturing method, the optical member is supplied in the form of a roll, so that optical members bondable to a large number of liquid crystal cells are available from a single continuous roll, which makes it possible to significantly increase the throughput of the liquid crystal panel manufacture and therefore is advantageous in terms of mass productivity. In general, the optical members include polarizing plates produced with PVA, a hydrophilic polymer, and therefore, they are delivered in a high moisture-proof package. In the continuous manufacturing method, however, the optical members can be delivered in the form of rolls, so that a large number of optical members can be packaged at a time, which can reduce the production of industrial waste as compared with the piece-by-piece method and therefore is advantageous in terms of cost. In the continuous manufacturing method, the optical member can be cut depending on the shape of the liquid crystal cell, so that there is no need to adjust the optical member to the shape of the liquid crystal cell by cutting after the bonding, which can improve the optical member yield.

The bonding step is preferably performed using a pair of pressing parts for nipping and pressing the liquid crystal cell and the optical member. Such a bonding step improves the travelling of both the liquid crystal cell and the optical member and therefore allows successful bonding of the optical member. From this point of view, in particular, a pair of rollers are preferably used as the pressing parts. The bonding step can be performed more successfully by nipping and pressing the liquid crystal cell and the optical member between the pair of rollers.

Effects of the Invention

As described above, the present invention makes it possible to prevent the liquid crystal panel from warping into a shape convex to the backlight side in the process of manufacturing the liquid crystal panel by bonding optical members to both surfaces of the liquid crystal cell. Therefore, the production of peripheral unevenness or indefinite unevenness in the liquid crystal panel is suppressed, so that a liquid crystal display device capable of achieving satisfactory display is produced.

EMBODIMENTS FOR CARRYING OUT THE INVENTION

Figure 1:
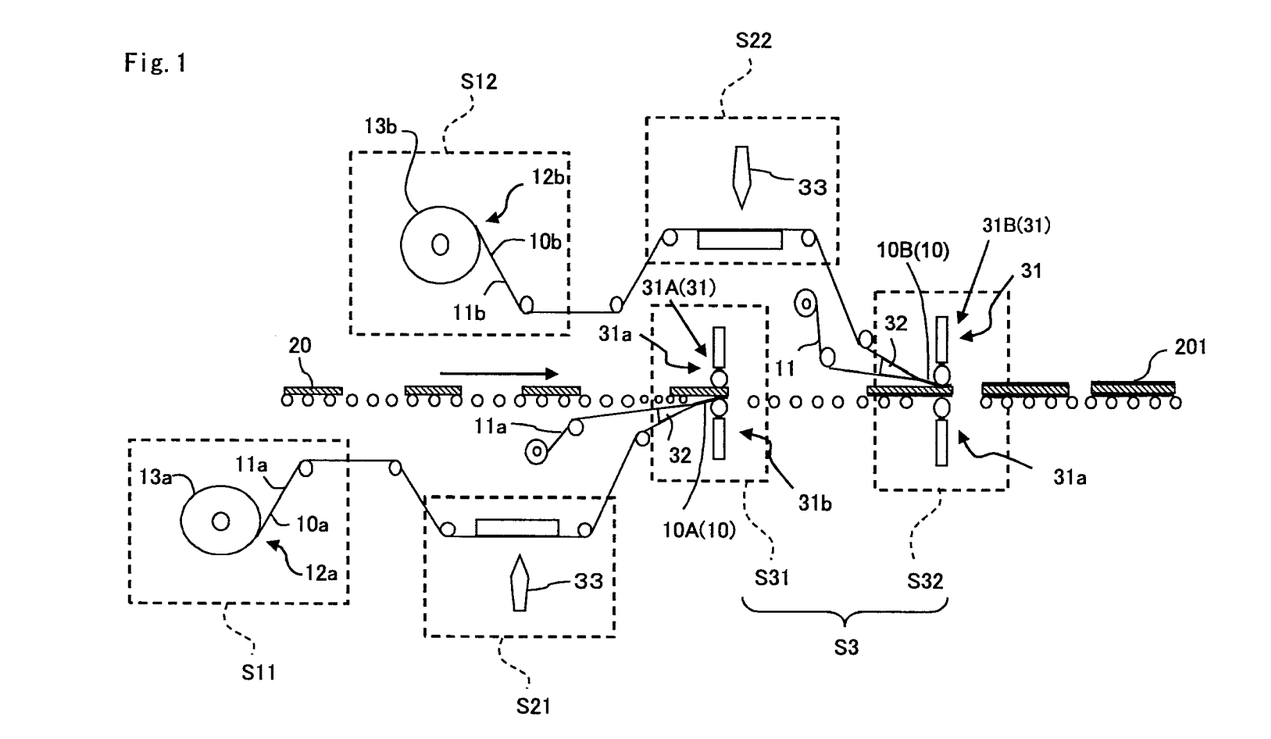
FIG. 1 is a side view showing a method according to an embodiment (first embodiment) of the present invention for continuously manufacturing a liquid crystal display device.

As shown in FIG. 1, the liquid crystal display device manufacturing method of the present invention includes a bonding step including bonding sheet-shaped optical members 10a and 10b, which each include a polarizing plate and an adhesive or pressure-sensitive adhesive layer, to both surfaces of a rectangular liquid crystal cell 20 with the adhesive or pressure-sensitive adhesive layer. Exemplary embodiments of the present invention include first and second embodiments, which are directed to continuous manufacturing methods, and a third embodiment, which is directed to a piece-by-piece manufacturing method. The first to third embodiments of the present invention are described below with reference to the drawings.

First Embodiment

FIG. 1 is a side view showing a liquid crystal display device manufacturing method according to an embodiment (the first embodiment) of the invention. As shown in FIG. 1, the method specifically includes: a first feeding step S11 including feeding a first long optical member material 12a from a first continuous roll 13a, wherein the first long optical member material 12a includes a first long optical member 10a and a first release film 11a placed on one surface of the first long optical member 10a, and the first continuous roll 13a includes a roll of the first long optical member material 12a; a first cutting step S21 including cutting the first long optical member 10a into a length corresponding to the short side width to form a first optical member 10A; and a first bonding step S31 including bonding the first optical member 10A to the backlight-side surface of a liquid crystal cell 20 while peeling off the first release film 11a.

The method also includes a second feeding step S12 including feeding a second long optical member material 12b from a second continuous roll 13b, wherein the second long optical member material 12b includes a second long optical member 10b and a second release film 11b placed on one surface of the second long optical member 10b, and the second continuous roll 13b includes a roll of the second long optical member material 12b; a second cutting step S22 including cutting the second long optical member 10b into a length corresponding to the long side width to form a second optical member 10B; and a second bonding step S32 including bonding the second optical member 10B to the viewer side surface of the liquid crystal cell 20 while peeling off the second release film 11b.

First, a description is given of the structure of the optical members 10A and 10B. For example, the optical members 10A and 10B each include a laminate of a polarizing plate formed by stretching in one direction, a protective film layer, and a pressure-sensitive adhesive layer or the like. In this embodiment, the laminate includes a polarizer and inside and outside protective film layers placed on both of the inside and outside surfaces of the polarizer, respectively. Any one of these protective films may only be used. The laminate also includes a pressure-sensitive adhesive layer placed inside the inside protective film layer, and a release film attached thereto. In the method for continuously manufacturing a liquid crystal panel, the release film is used as a carrier film.

The laminate preferably further includes a surface protecting film layer placed on the outside protective film layer with a weak pressure-sensitive adhesive layer interposed therebetween. Before the pressure-sensitive adhesive layer is formed, an electrically conductive layer may be formed on the inside protective film. If necessary, a hard coat layer, an antiglare layer, an anti-reflection layer, or the like may also be formed on the surface of the outside protective film. The pressure-sensitive adhesive layer is used for bonding to the liquid crystal panel. As used herein, the term "inside" refers to a liquid crystal cell 20-near side of the optical member 10 when the optical member 10 is placed on the liquid crystal cell 20, and the term "outside" refers to a side opposite to the inside.

If necessary, one or more pieces of retardation film or the like may also be provided inside the inside protective film. In such a case, the retardation film plays a role in viewing angle compensation, color compensation, or the like of the liquid crystal cell. In such a case, the retardation film may be bonded through a pressure-sensitive adhesive layer provided on the inside protective film, and as in the above case where the retardation film is not formed, the optical film has a pressure-sensitive adhesive layer at the most inside site, to which a release film 11a or 11b is also attached.

The inside protective film may also serve as a retardation film. In this case, an in-plane retardation, a thickness direction retardation, or an optical axis direction may be imparted as needed depending on the liquid crystal panel.

The polarizing plate has an absorption axis X along the stretched direction. Specifically, the long optical members 10a and 10b are each longitudinally formed along the absorption axis X, in which the longitudinal direction corresponds to the stretched direction of the polarizing plate. Therefore, the optical member 10A, which is formed by cutting the long optical member 10a into a predetermined length and fed to the first bonding step S31, has an absorption axis X along the transverse direction, and the optical member 10B, which is formed by cutting the long optical member 10b into a predetermined length and fed to the second bonding step S32, has an absorption axis X along the longitudinal direction.

The polarizing plate to be used may be any known conventional polarizing plate, and for example is preferably a polyvinyl alcohol (PVA) film having an iodine complex or a dichroic dye adsorbed and oriented therein. In this case, the iodine complex has an absorption axis in its orientation direction. The dichroic dye, which has a practically high level of optical properties, also has an absorption axis in its orientation direction. In general, the PVA film is strongly stretched in the longitudinal direction so that the iodine complex or the dichroic dye is oriented in the longitudinal direction, and, therefore, the polarizing plate has an absorption axis oriented parallel to the longitudinal direction.

For example, the inside protective film layer and the outside protective film layer are each preferably formed using a film made of triacetylcellulose resin, polyester resin, polycarbonate resin, cyclic polyolefin resin, (meth)acrylic resin, or the like. If necessary, these films may undergo such a process as stretching so as to have a certain retardation and then be used as compensation films.

As shown in FIG. 1, for example, the long optical members 10a and 10b are fed from the continuous rolls 13a and 13b by the first feeding step S11 and the second feeding step S12, respectively, and cut into the optical members 10A and 10B by the first cutting step S21 and the second cutting step S22, respectively, and the optical members 10A and 10B are supplied to the first bonding step S31 and the second bonding step S32, respectively.

The first feeding step S11 includes feeding the first long optical member material 12a from the first continuous roll 13a, wherein the first continuous roll 13a includes a roll of the long optical member material 12a, and the first long optical member material 12a includes: a first long optical member 10a formed with a width corresponding to the long side width of the liquid crystal cell 20 and including a polarizing plate having an absorption axis X along which the first long optical member 10a extends in the longitudinal direction (therefore, the first long optical member 10a extends along the stretched direction of the polarizing plate); and a first release film 11a placed on one surface of the first long optical member 10a.

The second feeding step S12 includes feeding the second long optical member material 12b from the second continuous roll 13b, wherein the second continuous roll 13b includes a roll of the long optical member material 12b, and the second long optical member material 12b includes: a second long optical member 10b formed with a width corresponding to the short side width of the liquid crystal cell 20 and including a polarizing plate having an absorption axis X along which the second long optical member 10b extends in the longitudinal direction (therefore, the second long optical member 10b extends along the stretched direction of the polarizing plate); and a second release film 11b placed on one surface of the second long optical member 10b.

The cutting steps S21 and S22 include cutting only the long optical members 10a and 10b of the long optical member materials 12a and 12b, respectively, using cutting means 33 (by so-called half-cutting) while leaving only the release films 11a and 11b uncut, so that the optical members 10A and 10B are formed on the long release films 11a and 11b, respectively. In the cutting steps S21 and S22, therefore, the optical members 10A and 10B are continuously allowed to be fed together with the release films 11a and 11b to the bonding steps S31 and S32. In the continuous manufacturing method, therefore, the long release films 11a and 11b serves as carrier films for feeding the optical members 10A and 10B to the bonding steps.

The long optical members 10a and 10b may be cut at intervals corresponding to the size of the liquid crystal cell 20 to be subjected to the bonding. Specifically, the long optical member 10a to be used in the first bonding step S31 is cut at intervals each substantially equal to the transverse length of the liquid crystal cell 20. On the other hand, the long optical member 10b to be used in the second bonding step S32 is cut at intervals each substantially equal to the longitudinal length of the liquid crystal cell 20. Therefore, the optical members 10A and 10B to be fed to the first and second bonding steps S31 and S32 each have substantially the same shape (rectangular shape) as the liquid crystal cell 20.

In an embodiment of the present invention, the bonding step S3 includes continuously pressing the optical member 10 from its end to bond the optical member 10 to the liquid crystal cell 20, while applying a tension to the optical member 10 and stacking the liquid crystal cell 20 and the optical member 10.

The apparatus shown in FIG. 1 includes: first bonding means 31A for performing the first bonding step S31 in which the liquid crystal cell 20 and the optical member 10A are nipped and bonded together while they are stacked; and second bonding means 31B for performing the second bonding step S32 in which the optical member 10B and the liquid crystal cell 20 with the optical member 10A bonded to its backlight side are nipped and bonded together while they are stacked. The first bonding means 31A is configured to press the liquid crystal cell 20 and the optical member 10A while nipping the optical member 10A and the liquid crystal cell 20 therein. Specifically, the first bonding means 31A includes a pair of linear pressing parts for pressing the liquid crystal cell 20 and the optical member 10A. Therefore, the first bonding step S31 includes pressing the liquid crystal cell 20 and the optical member 10A in a direction perpendicular to the pressing parts so that they can be bonded together.

Like the first bonding means 31A, the second bonding means 31B is also configured to press the liquid crystal cell 20 and the optical member 10B while nipping the optical member 10B and the liquid crystal cell 20 therein.

The first bonding step S31 includes bonding the optical member 10A to the backlight-side surface of the liquid crystal cell 20. Specifically, the first bonding step S31 includes placing the optical member 10A in such a manner that the absorption axis of the polarizing plate is kept parallel to the transverse direction of the liquid crystal cell 20, wherein the optical member 10A has a width corresponding to the length of the long side of the liquid crystal cell 20, and bonding the optical member 10A to the backlight-side surface of the liquid crystal cell 20 in a direction along the transverse direction.

More specifically, the first bonding step S31 includes using bonding means 31A including a pair of rollers 31a and 31b vertically arranged to face each other, inserting the optical member 10A and the liquid crystal cell 20 between the pair of rollers 31a and 31b while stacking the optical member 10A and the liquid crystal cell 20, and press-bonding the optical member 10A to one surface of the liquid crystal cell 20 to form a laminate. The pair of rollers 31a and 31b have linear pressing parts, respectively, which come into contact with the optical member 10A and the liquid crystal cell 20, respectively.

Figure 2:
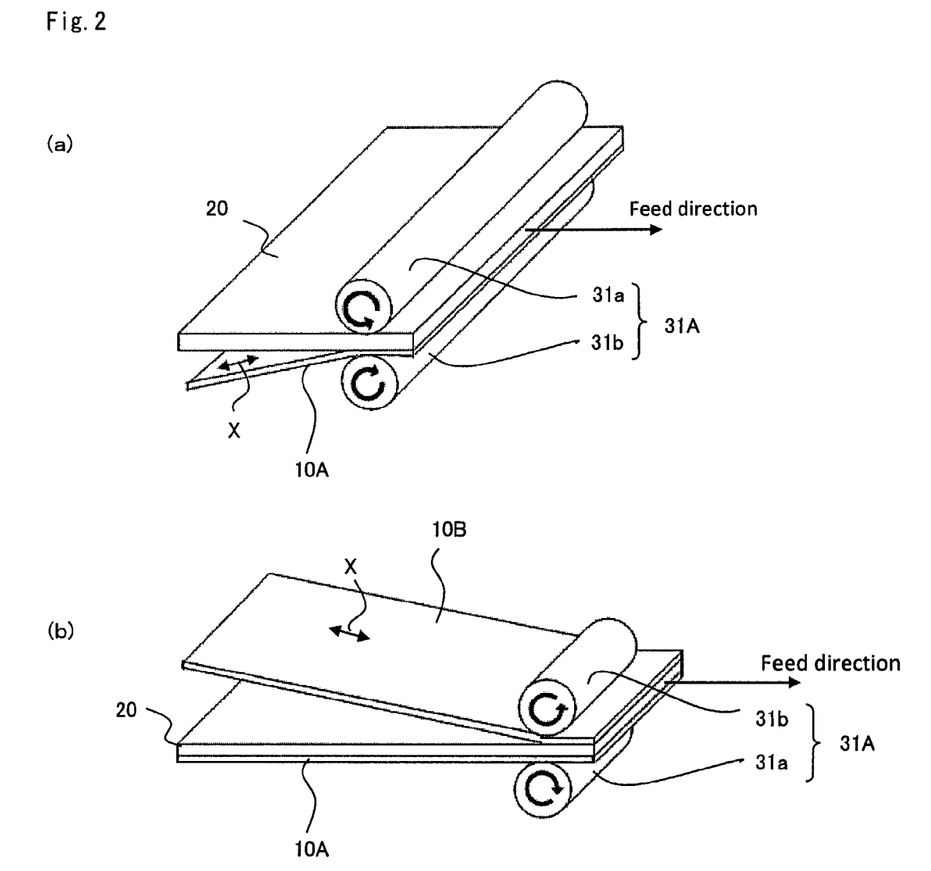
FIG. 2(a) is a perspective view showing the arrangement of a liquid crystal cell and an optical member in a first bonding step.
FIG. 2(b) is a perspective view showing the arrangement of the liquid crystal cell and optical members in a second bonding step.

More specifically, the bonding means 31A includes a guide roller 31a composed of a rubber roller driven by a motor and a boding roller 31b placed below the guide roller 31a and composed of a metal roller driven by a motor. A knife edge 32 is placed immediately in front of the bonding means 31A and used to peel off the optical member 10A from the release film 11a and to expose the pressure-sensitive adhesive layer, with which the optical member 10A and the liquid crystal cell 20 are bonded together. In FIGS. 2(a) to 2(b), the knife edge 32 and the release film 11 are not shown for clearness.

As shown in FIG. 2(a), the first bonding step S31A for bonding the optical member 10A and the liquid crystal cell 20 together includes placing and bonding the optical member 10A onto one surface of the liquid crystal cell 20 in a direction from one transverse end of the liquid crystal cell 20 to the other transverse end thereof, while keeping the absorption axis X of the polarizing plate parallel to the transverse direction of the liquid crystal cell 20. In the first bonding step S31A, therefore, the optical member 10A is first bonded to the liquid crystal cell 20 along the transverse direction of the liquid crystal cell 20.

Specifically, the bonding roller 31b is lowered to form a space between the guide roller 31a and the bonding roller 31b, and a transverse end (the front end in the feed direction) of the optical member 10A fed from below the liquid crystal cell 20 and a transverse end (the front end in the feed direction) of the liquid crystal cell 20 are placed between the guide roller 31a and the bonding roller 31b so that they can overlap each other. In this state, the absorption axis X (that is, the stretched direction) is kept parallel to the transverse direction of the liquid crystal cell 20.

Subsequently, the bonding roller 31b is shifted toward the guide roller 31a so that the end of the optical member 10A is press-bonded to the end of the liquid crystal cell 20. In this state, the guide roller 31a and the bonding roller 31b (specifically, the pair of pressing parts) are placed parallel to the longitudinal direction of the liquid crystal panel 10 and the optical member 10A, and the transverse end of the optical member 10A and the transverse end of the liquid crystal cell 20 are pressed against each other. The guide roller 31a and the bonding roller 31b are both rotated so that the optical member is press-bonded to one surface of the liquid crystal panel while the optical member 10A is placed on one surface of the liquid crystal panel in a direction from one transverse end of the liquid crystal panel to the other transverse end thereof.

The second bonding step S32 includes bonding the optical member 10B to the other surface of the liquid crystal cell 20. Specifically, the second bonding step S32 includes nipping the liquid crystal cell 20 and the optical member 10B between the pair of pressing parts to bond them together, while keeping the longitudinal direction of the liquid crystal cell 20 parallel to the absorption axis X of the polarizing plate and stacking the liquid crystal cell 20 and the optical member 10B.

Specifically, the second bonding step S32 includes press-bonding the optical member 10B to the other surface of the liquid crystal cell 20 of the laminate using bonding means 31B similarly to the first bonding step S31, so that a liquid crystal panel 201 is formed.

The second bonding step S32 also includes placing the pair of pressing parts parallel to the transverse direction of the liquid crystal cell 20. More specifically, the second bonding step S32 includes: feeding the optical member 10B and the laminate, respectively, in the longitudinal direction; inserting them between a pair of rollers 31a and 31b from their longitudinal ends; and press-bonding the liquid crystal cell 20 and the optical member 10B in a direction from one longitudinal end of the liquid crystal cell 20 to the other longitudinal end thereof by means of the pair of pressing parts. Therefore, the pair of pressing parts being kept parallel to the transverse direction of the liquid crystal cell 20 press the liquid crystal cell 20 and the optical member 10B and bond them along the longitudinal direction from one longitudinal end of the liquid crystal cell 20 to the other longitudinal end thereof.

As shown in FIG. 2(b), the second bonding step S32 for bonding the optical member 10B and the liquid crystal cell 20 together includes placing and bonding the optical member 10B onto the other surface of the liquid crystal cell 20 in a direction from one longitudinal end of the liquid crystal cell 20 to the other longitudinal end thereof, while keeping the absorption axis X of the polarizing plate parallel to the longitudinal direction of the liquid crystal cell 20. In the second bonding step S32, therefore, the optical member 10B is bonded to the liquid crystal cell 20 of the laminate, which is obtained in the first bonding step S31, along the longitudinal direction of the liquid crystal cell 20. In FIG. 2(b), the knife edge 32 and the release film 11 are not shown for clearness.

Specifically, the bonding roller 31b is elevated to form a space between the guide roller 31a and the bonding roller 31b, and a longitudinal end (the front end in the feed direction) of the optical member 10B fed from below the liquid crystal cell 20 and a longitudinal end (the front end in the feed direction) of the liquid crystal cell 20 are placed between the guide roller 31a and the bonding roller 31b so that they can overlap each other. In this state, the absorption axis X (that is, the stretched direction) is kept parallel to the longitudinal direction of the liquid crystal cell 20.

Subsequently, the bonding roller 31b is shifted toward the guide roller 31a so that the end of the optical member 10B is press-bonded to the end of the liquid crystal cell 20. In this state, the guide roller 31a and the bonding roller 31b (specifically, the pair of pressing parts) are placed parallel to the transverse direction of the liquid crystal cell 20 and the optical member 10B, and the longitudinal end of the optical member 10B and the longitudinal end of the liquid crystal cell 20 are pressed against each other. The guide roller 31a and the bonding roller 31b are both rotated so that the optical member is press-bonded to the other surface of the liquid crystal panel while the optical member is placed on the other surface of the liquid crystal panel in a direction from one longitudinal end of the liquid crystal panel to the other longitudinal end thereof. As a result, the liquid crystal panel 201 is formed, which includes the liquid crystal cell 20 and the optical members 10B bonded to both surfaces thereof.

A pair of any conventionally used substrates may be used to form the liquid crystal cell 20. One surface of the liquid crystal cell 20, to which the optical member 10A is bonded in the first bonding step S31, is placed on the side where light is received from a backlight installed in a liquid crystal display device.

The liquid crystal layer to be used may also be in any of various modes such as a VA mode and an in-plane switching (IPS) mode. While the present invention may be applied to any size of liquid crystal panel, the present invention is particularly effective in forming a large and thin liquid crystal panel. For example, the present invention is more effective in forming a large liquid crystal panel with a size of 32 inches (400 mm×700 mm) or more and a thickness of 2 mm or less.

The optical members 10A and 10B are bonded to the liquid crystal cell 20 while a tension is applied to the optical members 10A and 10B. The tension T is generally applied along the direction of feeding of the optical members 10A and 10B (that is, the longitudinal direction of the optical member materials 12a and 12b). Therefore, the tension T is applied in a direction along the absorption axis X of the polarizing plate.

In this embodiment, for example, a dancer roller (not shown), which is provided and used between the first cutting step S21 and the first bonding step S31 or between the second cutting step S22 and the second bonding step S32, moves vertically so that the tension T is applied between the dancer roller and the bonding roller 31b along the longitudinal direction (the direction along the absorption axis X) of the optical member material 12A or 12B. Alternatively, the tension may be applied, between the bonding roller 31b and a driving roller 31a placed before the bonding step, by the driving torque of a servomotor, which drives the rollers 31a and 31b. Thus, the tension T is applied to the optical members 10A and 10B, respectively, which are fed to the bonding steps S31 and S32, respectively. For example, even if the cutting steps S21 and S22 include cutting the long optical members 10a and 10b into the optical members 10A and 10B, respectively, while leaving the long release films 11a and 11b uncut, a tension can be applied to the optical members 10A and 10B as describe above, because the optical members 10A and 10B are bonded to the long release films 11a and 11b, respectively, with the pressure-sensitive adhesive interposed therebetween.

In the first bonding step S31, the tension T1 is preferably 300 N/m or less, more preferably 100 N/m or less. If it is higher than 300 N/m, the liquid crystal cell 20 with the optical member 10A bonded thereto by the first bonding step S31 may be significantly warped, so that the liquid crystal cell 20 may be cracked by the pressure from the bonding roll 31b in the second bonding step S32, the optical member 10A may suffer from optical distortion due to the tension-induced photo-elasticity, or any other undesirable event may occur.

Generally, in the method for continuously manufacturing a liquid crystal display device, at least a certain level of tension needs to be applied to the long optical members 10a and 10b or the long release films 11a and 11b used as carrier films for the purpose of feeding the films. This is because if there is no tension, the films will sag so that the feeding or the bonding cannot be successfully performed. In this case, the tension is generally 5 N/m or more, preferably 10 N/m or more.

The tension T2 applied in the second bonding step S32 may be in the same range as the tension T1 applied in the first bonding step S31. In such a case, it is preferred that the tension T1 in the first bonding step S31 be substantially equal to or greater than the tension T2 in the second bonding step S32, and therefore, the relation T1≧T2 (2) is particularly preferred. This can almost prevent curling into a shape convex to the backlight side even when a certain trigger such as an impact is applied.

The relation T1>T2 is more preferred, and T2 is preferably as small as possible, as long as there is no interference with the bonding.

According to the present invention, the second bonding step S32 is performed after the first bonding step S31. In this embodiment, rotation means S41 (not shown in FIG. 1) for horizontally rotating by 90° the liquid crystal cell 20 with the optical member 10A bonded to its backlight-side surface by the first bonding step S31 is preferably provided and used between the first bonding step S31 and the second bonding step S32.

The rotation means S41 may be configured to horizontally rotate the liquid crystal cell 20, which is fed along the transverse direction, by 90° so that the liquid crystal cell 20 can be fed along the longitudinal direction. According to this feature, the first bonding step S31 for bonding to the backlight-side surface of the liquid crystal cell 20 and the second bonding step S32 for bonding to the viewer-side surface thereof can be performed from the same direction, so that the manufacturing line can be conveniently made simple in terms of manufacturing apparatus arrangement.

As described above, the liquid crystal display device manufacturing method according to this embodiment can prevent the liquid crystal panel 201 from warping into a shape concave to the viewer side in the process of forming the liquid crystal panel 201 by bonding the optical members 10A and 10B to both sides of the liquid crystal cell 20, so that a good display state can be achieved.

Second Embodiment

Figure 4:
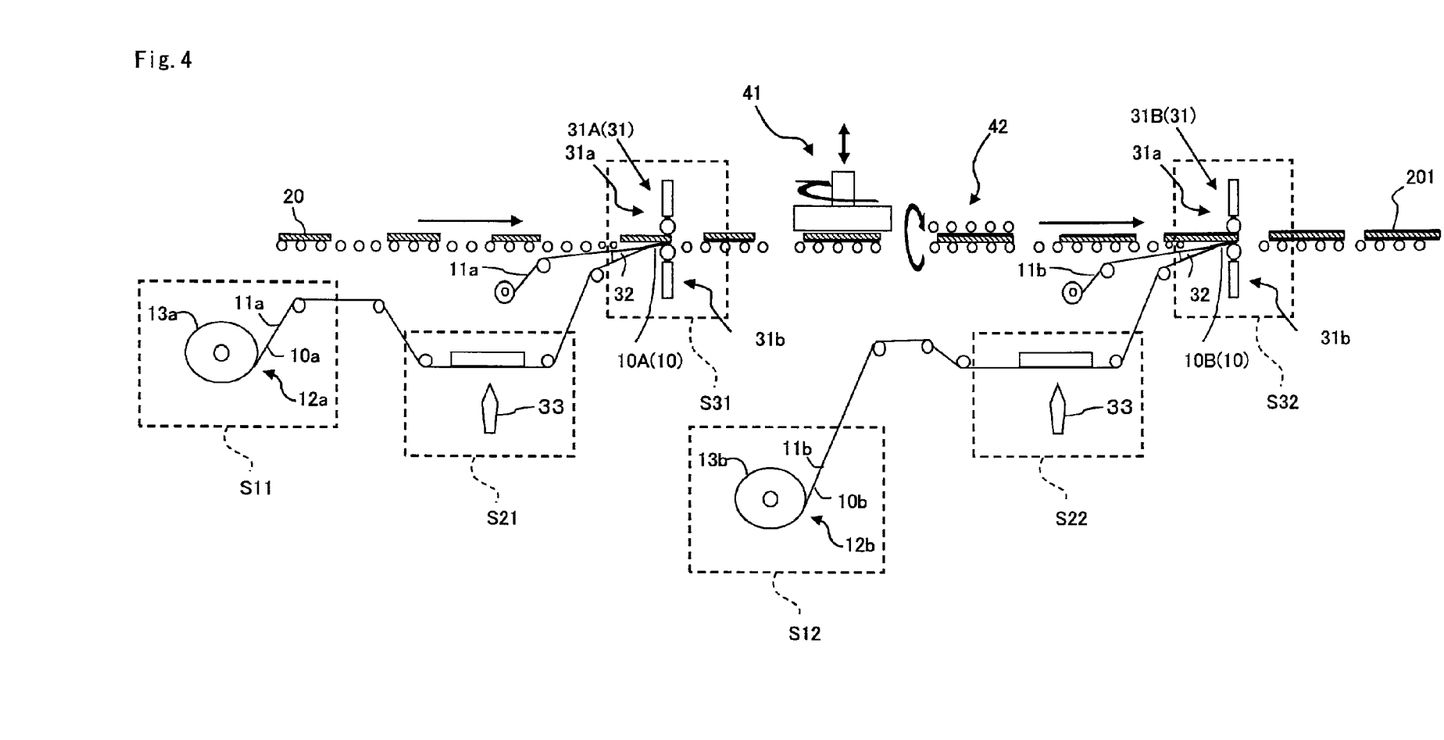
FIG. 4 is a side view showing a method according to another embodiment (second embodiment) of the present invention for continuously manufacturing a liquid crystal display device.

FIG. 4 shows another example of the method for continuously manufacturing a liquid crystal display device according to a second embodiment of the present invention. Similarly to the method shown in FIG. 1, the method according to the second embodiment includes: a first feeding step S11 including feeding a first long optical member material 12a from a first continuous roll 13a; a first cutting step S21 including cutting a first long optical member 10a into a length corresponding to the short side width to form a first optical member 10A; and a first bonding step S31 including bonding the first optical member 10A to the backlight-side surface of a liquid crystal cell 20 while peeling off a first release film 11a.

The method also includes a second feeding step S12 including feeding a second long optical member material 12b from a second continuous roll 13b; a second cutting step S22 including cutting a second long optical member 10b into a length corresponding to the long side width to form a second optical member 10B; and a second bonding step S32 including bonding the second optical member 10B to the viewer-side surface of the liquid crystal cell 20 while peeling off a second release film 11b. The first bonding step S31 is performed before the second bonding step S32.

As shown in FIG. 4, this embodiment provides an example where in the first bonding step S31 and the second bonding step S32, the optical members 10 are both bonded from a lower side to the liquid crystal cell 20 being fed in the horizontal direction. Turning means including: rotation means S41 for horizontally rotating by 90° the liquid crystal cell 20 with the optical member 10A bonded to its backlight-side surface in the first bonding step S31; and turnover means S42 for turning the panel surfaces upside down is provided and used between the first bonding step S31 and the second bonding step S32.

The rotation means S41 is configured to horizontally rotate the liquid crystal cell 20, which is fed along the transverse direction of the liquid crystal cell 20, by 90° so that the feed direction can be along the longitudinal direction. The turnover means S42 is configured to allow the surface, to which the optical member 10A is bonded in the first bonding step S31, to face upward. According to this feature, the first bonding step S31 for bonding to the backlight-side surface of the liquid crystal cell 20 and the second bonding step S32 for bonding to the viewer-side surface thereof can be performed from the same direction, so that the manufacturing line can be conveniently made simple in terms of manufacturing apparatus arrangement. FIG. 4 shows an example where both members are bonded from a lower side to the liquid crystal cell. Alternatively, however, both members may be bonded form an upper side.

In this embodiment, the rotation and the turnover of the liquid crystal cell 20 may be performed separately or simultaneously. When they are performed separately, the operation of the apparatuses in the rotation means S41 and the turnover means S42 becomes simple, which is preferred in terms of reliability and operation accuracy. When they are performed simultaneously, the rotation means S41 and the turnover means S42 can be integrated into a single apparatus, so that the apparatus can be advantageously reduced in size. The apparatus for simultaneously performing the rotation and the turnover may have a rotation mechanism and a turnover mechanism, which are simultaneously operable, but is preferably an apparatus for turning over the liquid crystal cell 20 about a single axis oblique to the short (or long) side of the liquid crystal cell 20.

Since this embodiment differs from the first embodiment only in that the liquid crystal cell 20 is turned upside down, other features of this embodiment may be the same as those of the first embodiment.

Third Embodiment

Figure 5:
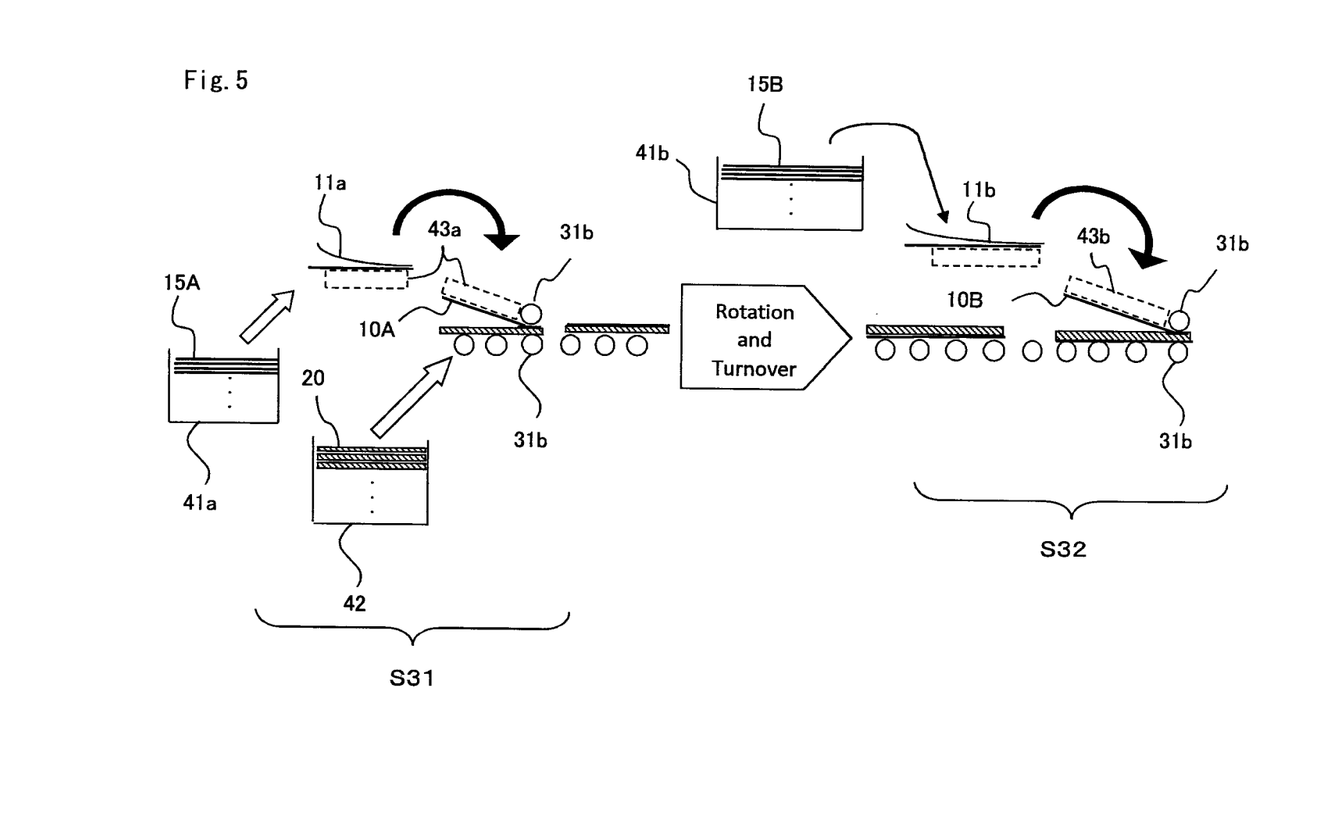
FIG. 5 is a side view showing a piece-by-piece method according to a further embodiment (third embodiment) of the present invention for manufacturing a liquid crystal display device.

Next, a description is given of a third embodiment which is shown in FIG. 5 and provides an example of the piece-by-piece manufacturing method according to the present invention. Referring to FIG. 5, the optical members 10A and 10B to be bonded to the liquid crystal cell 20 are each supplied in the form of a piece, and they are bonded to the release films 11a and 11b with their pressure-sensitive adhesives interposed therebetween to form optical member sheets 15A and 15B, respectively. The optical members 10A and 10B each include a polarizing plate and each have a rectangular shape with a side along the absorption axis of the polarizing plate and another side perpendicular thereto. They have been previously manufactured to fit the size of the liquid crystal cell 20.

The optical member 10A is formed to have a short side parallel to the absorption axis of the polarizing plate and will be bonded to the backlight-side surface of the liquid crystal cell 20 with its pressure-sensitive adhesive layer interposed therebetween. The optical member 10B is formed to have a long side parallel to the absorption axis of the polarizing plate and will be bonded to the viewer-side surface of the liquid crystal cell 20. In general, a certain number of each of optical member sheets 15A and 15B are stored as a batch in each of optical member cassette 41a and 41b and fed therefrom.

In the first bonding step S31, the liquid crystal cells 20 are generally supplied from a liquid crystal cell cassette 42 to the bonding apparatus and taken out piece by piece to be used. The optical member sheets 15A are taken out of the optical member cassette 41a piece by piece, and the optical member 10A separated from the release film 11a is bonded to the backlight-side surface of the liquid crystal cell 20.

In this process, the optical member 10A is sucked and fixed by holding means 43a and fed together with the liquid crystal cell 20 between a pair of bonding rollers 31b opposed to each other and placed perpendicular to the direction of feeding of the liquid crystal cell 20 and the optical member 10A. In the first bonding step S31, for example, the optical member 10A and the liquid crystal cell 20 are aligned in predetermined positions so that the long and short sides of the optical member 10A can be placed parallel to the long and short sides of the liquid crystal cell 20, respectively, and then the optical member 10A and the liquid crystal cell 20 are clamped by the rollers 31b and continuously pushed in the transverse direction of the liquid crystal cell 20. When the holding force of the holding means 43a is set at an appropriate level, the optical member 10A sucked by the holding means is allowed to slide, so that a tension T1b is applied to the optical member 10A between the bonding rollers.

The second bonding step S32 is performed after the first bonding step S31, and the liquid crystal cell 20 is usually supplied from the first bonding step S31 to the second bonding step S32. The optical member sheets 15B are taken out of the an optical member cassette 41b piece by piece, and after the release film 11b is peeled off, the optical member 10B is bonded to the viewer-side surface of the liquid crystal cell 20.

In the second bonding step S32, the optical member 10B is sucked and fixed by holding means 43b, and after the optical member 10B and the liquid crystal cell 20 are aligned in predetermined positions so that the long and short sides of the optical member 10B can be placed parallel to the long and short sides of the liquid crystal cell 20, respectively, the optical member 10B is fed together with the liquid crystal cell 20 between a pair of bonding rollers 31b opposed to each other and placed perpendicular to the direction of feeding of the liquid crystal cell and the optical member.

In the second bonding step S32, the optical member 10B and the liquid crystal cell 20 are clamped by the bonding rollers 31b and continuously pushed in the longitudinal direction of the liquid crystal cell. As in the first bonding step S31, a tension T2b can be applied to the optical member 10B between the bonding rollers by setting the holding force of the holding means 43b at an appropriate level.

In this process, the tension T1b in the first bonding step S31 and the tension T2b in the second bonding step S32 preferably have a similar relationship to the tension T1 and the tension T2 and, in particular, are preferably controlled to satisfy T1b≧T2b.

If necessary, between the first bonding step S31 and the second bonding step S32, the liquid crystal cell 20 may be rotated by 90° around the normal direction of the surface of the liquid crystal cell or turned upside down. The rotation and the turnover may be performed sequentially or simultaneously.

Other Embodiments

It will be understood that the liquid crystal display device manufacturing method according to the present invention is not limited to the embodiments and that the embodiments may be modified in various ways without departing from the gist of the invention.

(1) In the above embodiments, for example, the optical members 10 are obtained by half-cutting the optical member materials 12 and bonded to the liquid crystal cell 20. However, such a feature is non-limiting, and alternatively, the optical member materials 12 including the release films 11 may be fully cut (so-called full-cut), and the resulting cut pieces may be fed to the bonding steps S3 and bonded to the liquid crystal cell 20. In such a case, suction means may be used to feed the optical members 10, and then the bonding steps S3 may be performed using the same apparatus as in the third embodiment.

(2) The optical member materials 12 may also be fed in the long form to the bonding steps S3 without being subjected to cutting, and the long optical members 10 may be bonded to the liquid crystal cell 20. Specifically, the first bonding step S31 may include bonding the long optical member 10a to the liquid crystal cell 20 and then cutting the long optical member 10a into a length corresponding to the transverse length of the liquid crystal cell 20 to form a laminate, and the second bonding step S32 may include bonding the long optical member 10b to the resulting laminate and then cutting the long optical member 10b into a length corresponding to the longitudinal length of the liquid crystal cell 20 to form a liquid crystal panel 201.

(3) In another embodiment, broken cut lines may be formed in each of the long optical members 10a and 10b at predetermined intervals in the longitudinal direction in such a way that they are parallel to the transverse direction, and the bonding may be performed using the optical members with the broken cut lines. In this case, the interval between the cut lines in the long optical member 10a used in the first bonding step S31 is preferably substantially equal to the transverse length of the liquid crystal cell 20, and the interval between the cut lines in the long optical member 10b used in the second bonding step S32 is preferably substantially equal to the longitudinal length of the liquid crystal cell 20. After each of the bonding steps, the optical member may be cut using the cut lines as a guide, and the laminate and the liquid crystal panel 201 may be formed in the same manner.

(4) In the above embodiments, the optical member materials 12a and 12b are subjected to half-cutting in the cutting steps S21 and S22, respectively. However, such a feature is non-limiting, and alternatively, optical member materials having undergone half-cutting in advance may be used. In such a case, there is no need to perform the cutting steps S2, which makes it possible to prevent the influence of defects on the later steps (the bonding steps S3), which would otherwise be caused by the cutting steps S2.

(5) The optical members 10 are not limited to those in the above embodiments, and any of various optical members having various optical or physical functions may be used. For example, the optical member may include a brightness enhancement layer, a retardation layer, an anti-reflection layer, or any other functional layer as needed.

(6) In the above embodiments, bonding means used is bonding means 31 including a guide roller 31a and a bonding roller 31b. In the present invention, such means is non-limiting, and, for example, elastic plates may be used as bonding means.

(7) The above embodiments show a bonding method that includes moving and bonding the liquid crystal cell 20 and the optical member 10 using an apparatus having bonding means 31 fixed at the specific position. However, the present invention is not limited to the embodiments, and reversely, the liquid crystal panel and the optical member may be fixed at the specific position, and bonding means may be moved to bond them together, or bonding may be performed, while all of them are moved.

(8) In the above embodiments, a pair of rollers 31a and 31b have linear pressing parts for coming into contact with the liquid crystal panel 10 and the optical member 10, respectively. However, such a feature is non-limiting, and the contact parts may have a certain width. For example, the contact parts may have a planar shape.

EXAMPLES

The present invention is more specifically described with reference to the examples below and so on, which are not intended to limit to the scope of the invention.

Example 1

1. Materials (1) The liquid crystal cell to be used (rectangular in shape) was obtained by disassembling a liquid crystal display with a screen size of 32 inches and an aspect ratio of 16:9 (AQUOS LC-32D10 manufactured by Sharp Corporation).

(2) The optical member to be used was a polarizing plate (SEG1423DU manufactured by NITTO DENKO CORPORATION) having a pressure-sensitive adhesive layer and a release film.

(3) The continuous roll of the optical member to be used in the first bonding step had a width of 70 cm and half-cutting intervals of 40 cm.

(4) The continuous roll of the optical member to be used in the second bonding step had a width of 40 cm and half-cutting intervals of 70 cm.

2. Preparation of Liquid Crystal Panel

In the same manner as in the embodiments, the optical members were fed from the continuous rolls of the optical member materials to be used in the first and second bonding steps, respectively, and the optical members were cut in the cutting steps, while the release films were left uncut (half-cutting). Subsequently, the first and second bonding steps were performed in this order to form a liquid crystal panel. As described in the embodiments, the bonding means used had a guide roller composed of a rubber roller driven by a motor and a bonding roller composed of a metal roller driven by a motor. The bonding speed was 350 mm/second in each of the first and second bonding steps.

In the first bonding step, the conditions shown in Table 1 below were used for the "bonding direction" and the "surface to be bonded." In the first and second bonding steps, the conditions shown in Table 1 below were also used for the "tension T" applied along the longitudinal direction of the optical members. In the cutting step, the optical member was cut by the method shown in Table 1 below.

As regards the "bonding direction" in Table 1 below, "transverse direction" means a direction from one transverse end to the other of the liquid crystal cell, and "longitudinal direction" means a direction from one longitudinal end to the other of the liquid crystal cell.

As regards the "surface to be bonded" in Table 1 below, "downside" means the surface to be located on the side where light is received from a backlight installed in the liquid crystal display device (the backlight side), and "upside" means the surface that does not directly receive light from the backlight (the viewer side).

In Table 1 below, "continuous" means the half-cutting process, and "piece-by-piece" means the full-cutting process.

3. Measurement and Evaluation Methods (1) Measurement of the Amount of Warping

Figure 3:
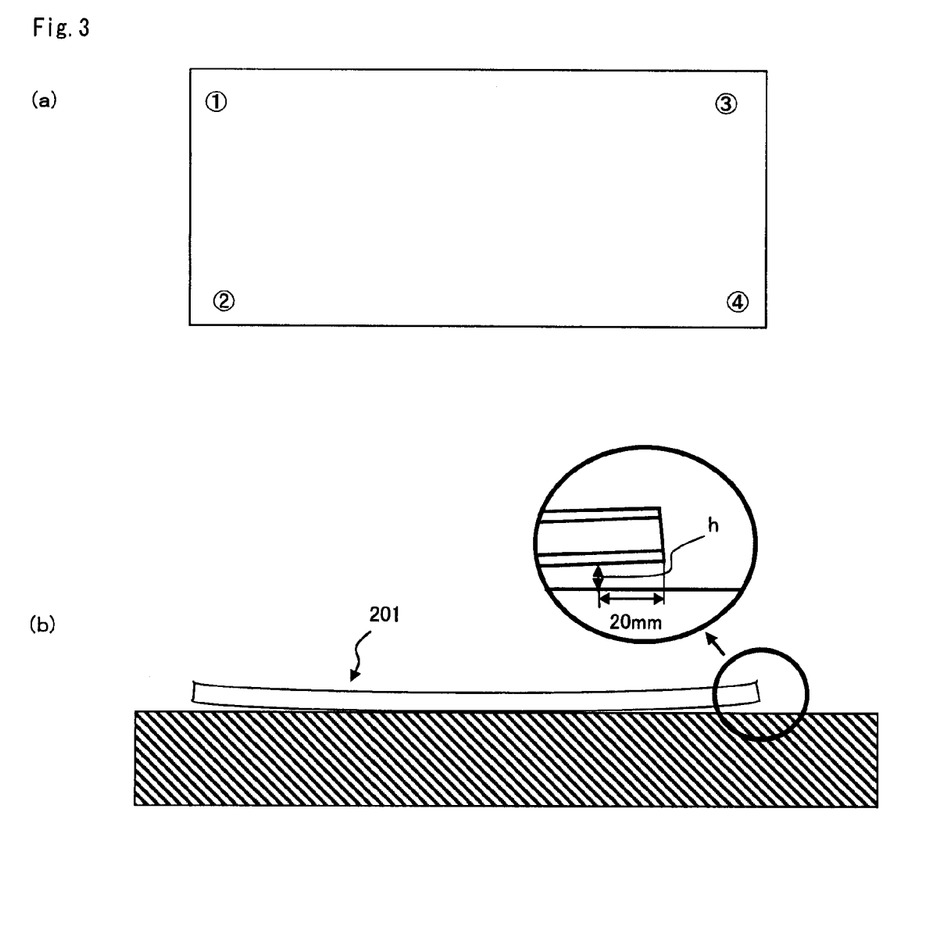
FIG. 3(a) is a plan view showing the places at which the amount of warping is measured in a liquid crystal panel in planar view.
FIG. 3(b) is a front view showing the places where the amount of warping is measured at the corners of the liquid crystal panel.

The resulting liquid crystal panel was placed on a surface plate in such a manner that the center of the panel was in contact with the surface plate (so that it was concave to the upper side), and at the four corners of the liquid crystal panel shown in FIG. 3(a), a thickness gauge was inserted as shown in FIG. 3(b) to measure the distance h between the surface plate and each of the points at the four corners of the liquid crystal panel, which was determined as the amount of warping. In the measurement, the thickness gauge was inserted from the warping arc into the position 20 mm from the short side end of the panel, and the measured value was rounded off to the first decimal place.

When the warping was concave to the backlight side and the maximum of the amount of warping at each place was less than 1 mm, the product was evaluated as "⊙" When warping was concave to the backlight side and the maximum was from 1 mm to less than 2 mm, the product was evaluated as "○" When the warping was concave to the backlight side and the maximum was from 2 mm to less than 3 mm, the product was evaluated as "Δ" When the warping was concave to the backlight side and the maximum was more than 3 mm or when the warping was concave to the viewer side, the product was evaluated as "x" The evaluation results are shown in Table 1 below. In Table 1, the amount of panel warping that is convex to the viewer side is indicated as a negative value, and the amount of panel warping that is convex to the backlight side is indicated as a positive value.

(2) Measurement of Tension T

A dancer roller was placed in a position between the continuous roll and the cutting step, and the bonding was performed while a certain tension was applied in the longitudinal direction of the optical member material from the dancer roller. In the case of the continuous bonding, the tension T was determined as the average of values at a tension pickup placed on the feed side of the bonding unit. In the case of the piece-by-piece bonding, the force applied when the film was sucked by a suction pad and moved horizontally was determined as the tension. The measurement results are shown in Table 1 below.

(3) Evaluation of Image Appearance

The image appearance was evaluated using the degree of peripheral frame-like unevenness, which was generated when black was displayed on the screen of the original product in which the resulting liquid crystal panel was incorporated and the backlight was turned on. Rank x, Δ, ○, and ⊙ were used in decreasing order of light leakage. When indefinite unevenness was generated at the center, the product was evaluated as "x" regardless of the degree of frame-like unevenness.

Examples 2 to 8

Liquid crystal panels were prepared under the same conditions as in Example 1, except that the tension T was applied under the conditions shown in Table 1 below, and the amount of warping was measured by the same method. The results of the evaluation of the amount of warping are shown in Table 1 below.

Examples 9 and 10

Liquid crystal panels were prepared under the same conditions as in Example 1, except that the first and second bonding steps were performed in such a way that each piece obtained by cutting (full-cutting) the optical member and the release film was bonded while being sucked. The amount of warping was measured by the same method. The results of the evaluation of the amount of warping are shown in Table 1 below. In Examples 9 and 10, the bonding tension T was adjusted by controlling the suction force of the suction pad.

Comparative Examples 1 to 4

Liquid crystal panels were prepared under the same conditions as in Example 1, except that the conditions shown in Table 1 were used for the surface to be bonded and the tension T and that the first and second bonding steps were reversed in order. The amount of warping was measured by the same method. The results of the evaluation of the amount of warping are shown in Table 1 below.

Comparative Examples 5 to 7

Liquid crystal panels were prepared under the same conditions as in Example 1, except that the conditions shown in Table 1 were used for the tension T and that the relationship between the high and low tensions was reversed. The amount of warping was measured by the same method. The results of the evaluation of the amount of warping are shown in Table 1 below.

Comparative Examples 8 and 9

Liquid crystal panels were prepared under the same conditions as in Example 1, except that the first and second bonding steps were performed in such a way that each piece obtained by cutting (full-cutting) the optical member and the release film was bonded while being sucked; the conditions shown in Table 1 were used for the surface to be bonded and the tension T; and the first and second bonding steps were reversed in order. The amount of warping was measured by the same method. The results of the evaluation of the amount of warping are shown in Table 1 below. In Comparative Examples 8 and 9, the bonding tension T was adjusted by controlling the suction force of the suction pad.

In Comparative Examples 5 to 7 where the tension in the first bonding step was lower than that in the second bonding step, the warping was convex to the backlight side, and the amount of warping was relatively large, which resulted in a degraded image appearance.

TABLE 1

| | Bonding direction | | | | Bonding tension (N) | | Amount (mm) of panel warping | | | | | | Evaluation |
|---|---|---|---|---|---|---|---|---|---|---|---|---|---|
| | First | Upside/Downside | Second | Upside/Downside | Continuous/Piece-by-Piece | First | Second | [1] | [2] | [3] | [4] | Maximum | Warping | Image appearance |
| Example 1 | Transverse direction | Downside | Longitudinal direction | Upside | Continuous | 100 | 50 | −0.5 | −0.7 | −0.5 | −0.8 | −0.8 | ⊙ | ⊙ |
| Example 2 | Transverse direction | Downside | Longitudinal direction | Upside | Continuous | 50 | 20 | −0.2 | −0.3 | −0.1 | −0.2 | −0.3 | ⊙ | ⊙ |
| Example 3 | Transverse direction | Downside | Longitudinal direction | Upside | Continuous | 25 | 10 | −0.1 | 0.0 | −0.1 | −0.1 | −0.1 | ⊙ | ⊙ |
| Example 4 | Transverse direction | Downside | Longitudinal direction | Upside | Continuous | 150 | 100 | −0.9 | −1.3 | −1.0 | −1.4 | −1.4 | ○ | ⊙ |
| Example 5 | Transverse direction | Downside | Longitudinal direction | Upside | Continuous | 200 | 150 | −1.7 | −2.1 | −1.9 | −2.0 | −2.1 | Δ | ○ |
| Example 6 | Transverse direction | Downside | Longitudinal direction | Upside | Continuous | 300 | 200 | −2.6 | −2.1 | −2.5 | −2.8 | −2.8 | Δ | ○ |
| Example 7 | Transverse direction | Downside | Longitudinal direction | Upside | Continuous | 100 | 100 | −0.3 | −0.5 | −0.5 | −0.7 | −0.7 | ⊙ | ⊙ |
| Example 8 | Transverse direction | Downside | Longitudinal direction | Upside | Continuous | 50 | 50 | −0.3 | −0.1 | −0.1 | −0.2 | −0.3 | ⊙ | ⊙ |
| Example 9 | Transverse direction | Downside | Longitudinal direction | Upside | Piece-by-Piece | 50 | 50 | −0.2 | −0.1 | −0.1 | −0.2 | −0.2 | ⊙ | ⊙ |
| Example 10 | Transverse direction | Downside | Longitudinal direction | Upside | Piece-by-Piece | 50 | 30 | −0.3 | −0.1 | −0.1 | −0.2 | −0.3 | ⊙ | ⊙ |
| Comparative Example 1 | Longitudinal direction | Upside | Transverse direction | Downside | Continuous | 100 | 50 | 1.7 | 1.9 | 2.2 | 1.4 | 2.2 | X | X |
| Comparative Example 2 | Longitudinal direction | Upside | Transverse direction | Downside | Continuous | 50 | 100 | 0.8 | 0.4 | 0.7 | 0.5 | 0.8 | X | Δ |
| Comparative Example 3 | Longitudinal direction | Upside | Transverse direction | Downside | Continuous | 100 | 100 | 1.6 | 1.2 | 1.9 | 1.6 | 1.9 | X | X |
| Comparative Example 4 | Longitudinal direction | Upside | Transverse direction | Downside | Continuous | 50 | 50 | 1.3 | 1.1 | 0.9 | 1.3 | 1.3 | X | X |
| Comparative Example 5 | Transverse direction | Downside | Longitudinal direction | Upside | Continuous | 50 | 100 | 1.0 | 0.8 | 1.4 | 1.2 | 1.4 | X | X |
| Comparative Example 6 | Transverse direction | Downside | Longitudinal direction | Upside | Continuous | 50 | 150 | 1.6 | 2.2 | 1.9 | 2.4 | 2.4 | X | X |
| Comparative Example 7 | Transverse direction | Downside | Longitudinal direction | Upside | Continuous | 50 | 200 | 2.5 | 2.6 | 2.2 | 2.5 | 2.6 | X | X |
| Comparative Example 8 | Longitudinal direction | Upside | Transverse direction | Downside | Piece-by-Piece | 50 | 30 | 1.2 | 1.1 | 1.2 | 1.1 | 1.2 | X | X |
| Comparative Example 9 | Longitudinal direction | Upside | Transverse direction | Downside | Piece-by-Piece | 50 | 50 | 1.3 | 1.2 | 1.0 | 1.2 | 1.3 | X | Δ |

Examples 1 to 8 and Comparative Examples 1 to 4 each using the half-cutting method were compared. In Examples 1 to 8 where the bonding was performed first on the backlight side in the transverse direction, the warping was concave to the backlight side, and the image appearance was good. However, in Comparative Examples 1 to 4 where the bonding was performed first on the viewer side in the longitudinal direction, the warping was convex to the backlight side, which resulted in a degraded image appearance.

Examples 9 and 10 and Comparative Examples 8 and 9 each using the piece-by-piece method were compared. In Examples 9 and 10 where the bonding was performed first on the backlight side in the transverse direction, the warping was concave to the backlight side, and the image appearance was good. However, in Comparative Examples 8 and 9 where the bonding was performed first on the viewer side in the longitudinal direction, the warping was convex to the backlight side, which resulted in a degraded image appearance.

Description of Reference Characters

In the drawings, reference characters 10, 10A, and 10B represent an optical member, 10a and 10b a long optical member, 11a and 11b a release film, 12a and 12b an optical member material, 20 a liquid crystal cell, 31 bonding means, 31a a guide roller, 31b a bonding roller, 32 a knife edge, 33 cutting means, 201a liquid crystal panel, S11a first feeding step, S12 a second feeding step, S21a first cutting step, S22 a second cutting step, S3 a bonding step, S31a first bonding step, S32 a second bonding step, and X an absorption axis.

The invention claimed is:
1. A method for manufacturing a liquid crystal display device, comprising:
a bonding step comprising providing sheet-shaped optical members each comprising a polarizing plate and an adhesive layer or a pressure-sensitive adhesive layer and bonding the sheet-shaped optical members to both surfaces of a rectangular liquid crystal cell with the adhesive layer or the pressure-sensitive adhesive layer, wherein the bonding step comprises continuously pressing the optical member from its end to bond the optical member to the liquid crystal cell, while applying a tension to the optical member and stacking the liquid crystal cell and the optical member, the bonding step comprises: a first bonding step comprising placing the optical member in such a manner that an absorption axis of the polarizing plate is kept parallel to a transverse direction of the liquid crystal cell, wherein the optical member has a width corresponding to the length of a long side of the liquid crystal cell, and bonding the optical member to a backlight-side surface of the liquid crystal cell in a direction along the transverse direction; and a second bonding step comprising placing the optical member in such a manner that an absorption axis of the polarizing plate is kept parallel to a longitudinal direction of the liquid crystal cell, wherein the optical member has a width corresponding to the length of a short side of the liquid crystal cell, and bonding the optical member to a viewer-side surface of the liquid crystal cell in a direction along the longitudinal direction, the tension applied to the optical member in the first bonding step is substantially equal to or higher than the tension applied to the optical member in the second bonding step, and the first bonding step is performed before the second bonding step.

2. The method according to claim 1, wherein the optical member used in the first bonding step has been previously cut into a length corresponding to the length of the short side of the liquid crystal cell, and the optical member used in the second bonding step has been previously cut into a length corresponding to the length of the long side of the liquid crystal cell.

3. The method according to claim 1, further comprising: using a release film on which the adhesive or pressure-sensitive adhesive layer of each of the optical members is placed; and feeding the optical members to the first and second bonding steps while peeling off the release film from each of the optical members.

4. The method according to any one of claim 1, further comprising, before the bonding step, obtaining each of the sheet-shaped optical members by transversely cutting, at predetermined intervals, a long sheet comprising a laminate of the optical member, the adhesive or pressure-sensitive adhesive layer, and a release film placed on the adhesive or pressure-sensitive adhesive layer while leaving the release film uncut.

5. The method according to any one of claim 1, wherein the bonding step is performed using a pair of pressing parts for nipping and pressing the liquid crystal cell and the optical member.

6. The method according to claim 2, further comprising: using a release film on which the adhesive or pressure-sensitive adhesive layer of each of the optical members is placed; and feeding the optical members to the first and second bonding steps while peeling off the release film from each of the optical members.

7. The method according to claim 2, further comprising, before the bonding step, obtaining each of the sheet-shaped optical members by transversely cutting, at predetermined intervals, a long sheet comprising a laminate of the optical member, the adhesive or pressure-sensitive adhesive layer, and a release film placed on the adhesive or pressure-sensitive adhesive layer while leaving the release film uncut.

8. The method according to claim 2, wherein the bonding step is performed using a pair of pressing parts for nipping and pressing the liquid crystal cell and the optical member.

* * * * *